US011918967B1

(12) United States Patent
Lindberg et al.

(10) Patent No.: US 11,918,967 B1
(45) Date of Patent: Mar. 5, 2024

(54) SYSTEM AND METHOD FOR MAGMA-DRIVEN THERMOCHEMICAL PROCESSES

(71) Applicant: EnhancedGEO, LLC, St. Petersburg, FL (US)

(72) Inventors: Greg Lindberg, St. Petersburg, FL (US); Kimberly C. Conner, St. Petersburg, FL (US)

(73) Assignee: EnhancedGEO Holdings, LLC, St. Petersburg, FL (US)

(*) Notice: Subject to any disclaimer, the term of this patent is extended or adjusted under 35 U.S.C. 154(b) by 0 days.

(21) Appl. No.: 17/976,159

(22) Filed: Oct. 28, 2022

Related U.S. Application Data

(60) Provisional application No. 63/405,276, filed on Sep. 9, 2022.

(51) Int. Cl.
*B01J 19/00* (2006.01)
*F24T 50/00* (2018.01)

(52) U.S. Cl.
CPC .......... *B01J 19/0013* (2013.01); *F24T 50/00* (2018.05); *B01J 2208/0053* (2013.01); *B01J 2219/00103* (2013.01)

(58) Field of Classification Search
CPC .... B01J 19/00; B01J 19/0006; B01J 19/0013; B01J 2208/00; B01J 2208/00008; B01J 2208/00017; B01J 2208/0053; B01J 2219/00; B01J 2219/00049; B01J 2219/00051; B01J 2219/00074; B01J 2219/00087; B01J 2219/00103; F24T 50/00
See application file for complete search history.

(56) References Cited

U.S. PATENT DOCUMENTS

| 3,498,381 A | 3/1970 | Earlougher, Jr. |
| 3,613,806 A | 10/1971 | Malott |
| 3,757,516 A | 9/1973 | McCabe |
| 3,765,477 A | 10/1973 | Van |

(Continued)

FOREIGN PATENT DOCUMENTS

| AU | 2018308861 A1 | 1/2020 |
| AU | 2017268378 B2 | 9/2021 |

(Continued)

OTHER PUBLICATIONS

Boehm, R.F. et al., Modelling of a Magma Energy Geothermal Power Plant, presented at ASME Winter Annual Meeting, Boston MA, Dec. 1987, SAND-87-0564C, DE88 003793, 11 pages.

(Continued)

*Primary Examiner* — Natasha E Young
(74) *Attorney, Agent, or Firm* — Stephen Y. Liu; Carstens, Allen & Gourley, LLP

(57) ABSTRACT

A method for carrying out a thermochemical process includes injecting one or more feed streams into a reaction chamber. The reaction chamber is maintained at a reaction temperature using heat obtained directly from a subterranean heat source. The method includes maintaining the one or more feed streams in the reaction chamber for a residence time to form one or more product streams from the one or more feed streams. The one or more product streams are removed from the reaction chamber.

24 Claims, 12 Drawing Sheets

(56) References Cited

U.S. PATENT DOCUMENTS

| | | |
|---|---|---|
| 3,864,208 A | 2/1975 | Van |
| 3,950,949 A | 4/1976 | Martin et al. |
| 3,957,108 A | 5/1976 | Huisen |
| 3,967,675 A | 7/1976 | Georgii |
| 4,043,129 A | 8/1977 | McCabe et al. |
| 4,047,093 A | 9/1977 | Levoy |
| 4,054,176 A | 10/1977 | Huisen |
| 4,057,108 A | 11/1977 | Broussard |
| 4,116,285 A | 9/1978 | Guerber |
| 4,140,184 A | 2/1979 | Bechtold et al. |
| 4,492,083 A | 1/1985 | McCabe et al. |
| 4,642,987 A | 2/1987 | Csorba et al. |
| 4,665,705 A | 5/1987 | Bonham, Jr. |
| 4,776,169 A | 10/1988 | Coles, Jr. |
| 4,929,348 A | 5/1990 | Rice |
| 5,513,573 A | 5/1996 | Sutton |
| 5,860,279 A | 1/1999 | Bronicki et al. |
| 5,911,684 A * | 6/1999 | Shnell ............... F24T 10/20 60/659 |
| 6,708,494 B1 | 3/2004 | Hamann |
| 7,124,584 B1 | 10/2006 | Wetzel et al. |
| 8,011,450 B2 | 9/2011 | Krueger et al. |
| 8,047,285 B1 * | 11/2011 | Smith ............... E21B 43/24 166/305.1 |
| 8,201,409 B1 | 6/2012 | Zakiewicz |
| 8,524,787 B2 | 9/2013 | Ermolaev et al. |
| 9,006,298 B2 | 4/2015 | Leviness et al. |
| 9,108,858 B2 | 8/2015 | McDonald et al. |
| 9,150,423 B2 | 10/2015 | Hosono et al. |
| 9,182,149 B2 | 11/2015 | Gilaberte et al. |
| 9,298,756 B1 | 3/2016 | Johnson |
| 9,359,271 B2 | 6/2016 | Leviness et al. |
| 9,388,797 B2 | 7/2016 | Bronicki |
| 9,574,551 B2 | 2/2017 | Parrella et al. |
| 9,738,835 B2 | 8/2017 | Schrauwen |
| 9,765,605 B2 | 9/2017 | Williamson et al. |
| 10,017,395 B2 | 7/2018 | Kageyama et al. |
| 10,058,848 B2 | 8/2018 | Lipiec et al. |
| 10,131,545 B2 | 11/2018 | Sekine et al. |
| 10,173,202 B2 | 1/2019 | Hosono et al. |
| 10,203,162 B2 | 2/2019 | Yokomine et al. |
| 10,322,940 B2 | 6/2019 | Hosono et al. |
| 10,344,233 B2 | 7/2019 | Lucas et al. |
| 10,358,604 B2 | 7/2019 | Harris et al. |
| 10,710,049 B2 | 7/2020 | Mikhajlov et al. |
| 10,745,625 B2 | 8/2020 | Dogterom et al. |
| 10,759,668 B2 | 9/2020 | Hosono et al. |
| 10,792,645 B2 | 10/2020 | Hosono et al. |
| 10,974,969 B2 | 4/2021 | Hu et al. |
| 11,131,484 B2 | 9/2021 | McBay |
| 11,235,310 B2 | 2/2022 | Hosono et al. |
| 11,286,169 B2 | 3/2022 | Beach et al. |
| 11,325,105 B2 | 5/2022 | Beach et al. |
| 2004/0265158 A1 | 12/2004 | Boyapati et al. |
| 2006/0026961 A1 | 2/2006 | Bronicki |
| 2006/0180537 A1 | 8/2006 | Loftis et al. |
| 2006/0277917 A1 | 12/2006 | Hsu |
| 2008/0213157 A1 | 9/2008 | McGrady et al. |
| 2009/0226308 A1 | 9/2009 | Vandor |
| 2010/0025260 A1 | 2/2010 | Naterer et al. |
| 2010/0045042 A1 | 2/2010 | Hinders et al. |
| 2012/0144829 A1 | 6/2012 | Wiggs et al. |
| 2013/0101492 A1 | 4/2013 | McAlister |
| 2013/0232973 A1 | 9/2013 | McBay |
| 2013/0234444 A1 | 9/2013 | Rogers et al. |
| 2013/0333383 A1 | 12/2013 | Schwarck |
| 2014/0262137 A1 | 9/2014 | McBay |
| 2015/0128931 A1 | 5/2015 | Joshi et al. |
| 2015/0300327 A1 | 10/2015 | Sweatman et al. |
| 2015/0368565 A1 | 12/2015 | Schrauwen |
| 2015/0377211 A1 | 12/2015 | Occhiello |
| 2016/0097376 A1 | 4/2016 | Wasyluk et al. |
| 2016/0115945 A1 | 4/2016 | Barsi et al. |
| 2016/0251953 A1 | 9/2016 | Samuel et al. |
| 2016/0363350 A1 | 12/2016 | Tahara |
| 2017/0253492 A1 | 9/2017 | Beach et al. |
| 2018/0106138 A1 | 4/2018 | Randolph |
| 2018/0224164 A1 | 8/2018 | Lakic |
| 2020/0040267 A1 | 2/2020 | Willigenburg et al. |
| 2020/0072199 A1 | 3/2020 | Fontana et al. |
| 2020/0231455 A1 | 7/2020 | Beach et al. |
| 2020/0325030 A1 | 10/2020 | Cussler et al. |
| 2020/0353518 A1 | 11/2020 | Chandran et al. |
| 2021/0114005 A1 | 4/2021 | Tao et al. |
| 2021/0122656 A1 | 4/2021 | Willberg et al. |
| 2023/0130169 A1 | 4/2023 | McIntyre |
| 2023/0272947 A1 | 8/2023 | Lindberg et al. |

FOREIGN PATENT DOCUMENTS

| | | |
|---|---|---|
| AU | 2016398360 B2 | 1/2022 |
| CN | 105148824 A | 12/2015 |
| CN | 108952650 A | 12/2018 |
| CN | 112604697 A | 4/2021 |
| CN | 113494273 A | 10/2021 |
| CN | 113562692 A | 10/2021 |
| EP | 0236640 A1 | 9/1987 |
| EP | 0326736 A2 | 8/1989 |
| EP | 2792010 B1 | 1/2018 |
| EP | 3583321 A1 | 12/2019 |
| GB | 2592695 A | 9/2021 |
| GB | 2615913 A | 8/2023 |
| JP | 107286760 A | 10/1995 |
| JP | 2011052621 A | 3/2011 |
| JP | 2014202149 A | 10/2014 |
| JP | 2020067027 A | 4/2020 |
| WO | 2009116873 A1 | 9/2009 |
| WO | 2012079078 A2 | 6/2012 |
| WO | 2012037571 A3 | 7/2012 |
| WO | WO-2013025640 A2 * | 2/2013 ........ B01J 19/0013 |
| WO | 2016204287 A1 | 12/2016 |
| WO | 2020150245 A1 | 7/2020 |
| WO | 2020160500 A1 | 8/2020 |
| WO | 2021257944 A9 | 4/2022 |
| WO | 2022123626 A1 | 6/2022 |
| WO | 2022211643 A1 | 10/2022 |

OTHER PUBLICATIONS

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

* cited by examiner

SYSTEM AND METHOD FOR MAGMA-DRIVEN THERMOCHEMICAL PROCESSES

CROSS-REFERENCE TO RELATED APPLICATIONS

This application claims priority to U.S. Provisional Application No. 63/405,276, filed on Sep. 9, 2022, entitled "SYSTEM AND METHOD FOR MAGMA-DRIVEN THERMOCHEMICAL PROCESSES", which is hereby incorporated herein by reference in its entirety.

BACKGROUND

Technical Field

Novel aspects of the present disclosure relate to novel systems and related methods for carrying out thermochemical processes, and more particularly to systems and methods for conducting reactions using thermal energy harnessed directly from a subterranean heat source, such as magma reservoirs.

Background

Thermochemical reactions can be carried out to create useful end products such as hydrogen, ammonia, methane, diesel, kerosene, gasoline, and other forms of green fuel. These chemical reactions can be carried out by existing processes. Some of these chemical reactions can only be carried out at elevated temperatures that provide the requisite activation energy. Some of these chemical reactions can be carried out at room temperature, but only economically at elevated temperatures that provide a desired rate of reaction. However, the costs associated with obtaining the elevated temperatures may render these processes economically unfeasible.

SUMMARY

Novel aspects of the present disclosure are directed to a method for carrying out thermochemical processes. The method includes the steps of injecting one or more feed streams into a reaction chamber, maintaining the one or more feed streams in the reaction chamber for a residence time to form one or more product streams from the one or more feed streams, and removing the one or more product streams from the reaction chamber. The reaction chamber is maintained at a reaction temperature using heat obtained directly from a subterranean heat source.

Novel aspects of the present disclosure are also directed to a system for carrying out thermochemical processes. The system includes a wellbore extending from a surface towards a subterranean heat source and a reaction chamber configured to be maintained at a reaction temperature using heat obtained directly from the subterranean heat source. In some embodiments, the reaction chamber includes one or more inlets configured to receive one or more feed streams and one or more outlets configured to expel one or more product streams from the reaction chamber. The one or more product streams are formed from the one or more feed streams in response to maintaining the one or more feed streams within the reaction chamber for a residence time.

Other aspects, embodiments and features of the disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of each embodiment shown where illustration is not necessary to allow those of ordinary skill in the art to understand the disclosure.

BRIEF DESCRIPTION OF THE FIGURES

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying figures, wherein:

DETAILED DESCRIPTION

Geothermal systems have been proposed to offset the high cost of carrying out thermochemical processes. However, these conventional geothermal systems generate electricity by harnessing steam from production wells that are heated by a renewable, subterranean heat source, powering turbines with the steam to create electricity that is inefficiently stored, then transported over long distances to power a heating apparatus that drives thermochemical processes. The numerous steps for converting geothermal energy into electricity for powering heating apparatuses is inefficient, which increases cost of production of green fuels and other end products. Other forms of renewable energy, such as solar and wind, are unpredictable and inefficient, and still require the various inefficient systems for producing heat and pressure. Fossil fuel systems may be required as a reserve. Other conventional systems that may not require the same elevated temperature requirements may be too expensive to implement on a widespread basis.

Novel aspects of the present disclosure recognize the need for an improved system and method for leveraging renewable geothermal energy for driving thermochemical processes without the unavoidable costs, inefficiencies, and unpredictability of other renewable energy systems and methods. In particular, the improved system and method provide a reaction chamber with heat obtained directly from a subterranean heat source, e.g., a magma body. One or more feed streams introduced into the reaction chamber can use the heat to form end products via thermochemical process.

Exemplary thermochemical processes described in this disclosure include the Haber Bosch process that forms ammonia, the Fischer-Tropsche process that forms tail gasses and liquid hydrocarbons, and the thermochemical splitting of water that forms H2 and O2 gasses from water.

Figure 1A:
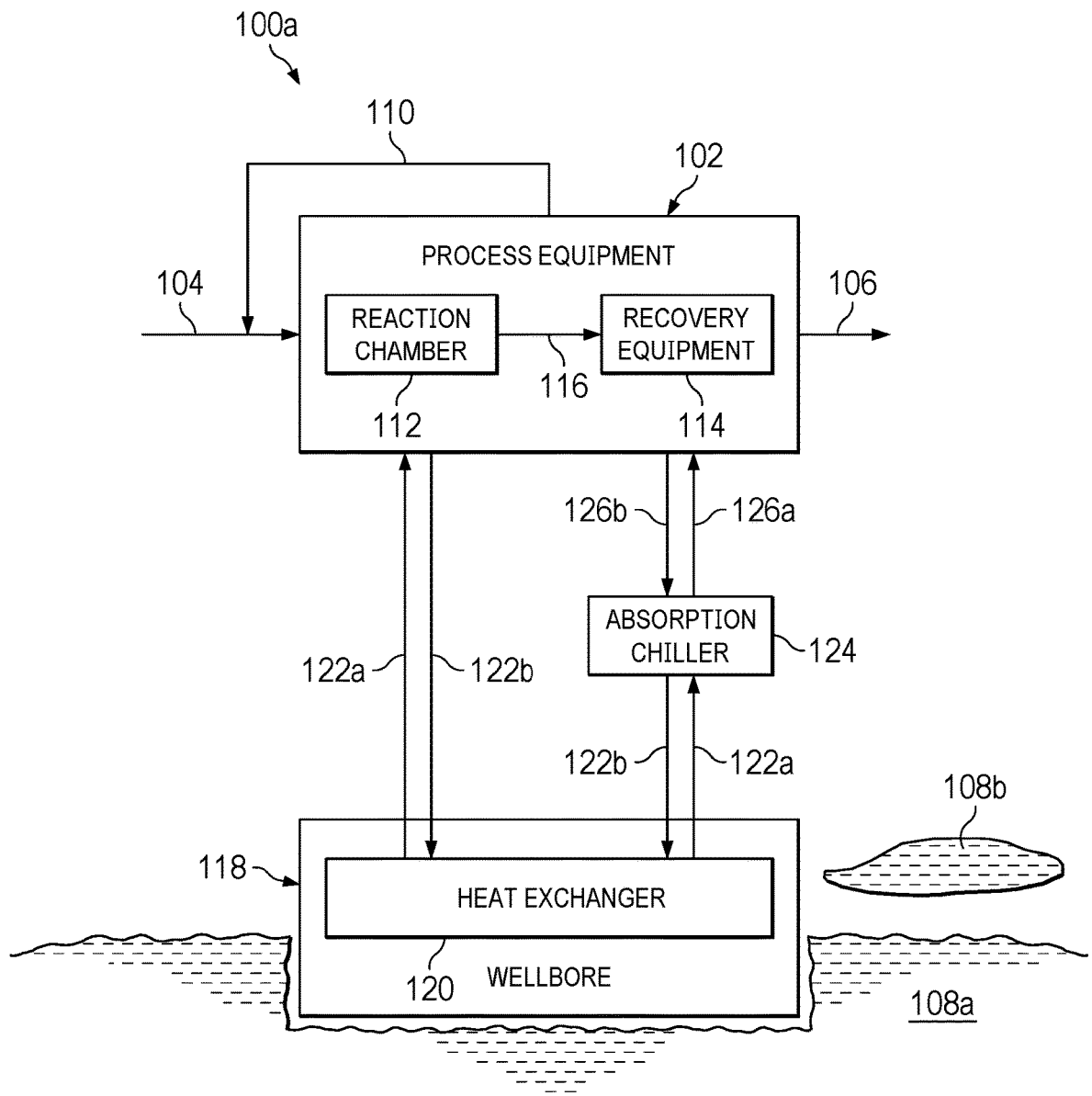
FIG. 1A is a simplified block diagram of a system for conducting thermochemical processes according to an illustrative embodiment.

FIG. 1A is a simplified block diagram of a system for carrying out a thermochemical process according to an illustrative embodiment. Non-limiting examples of thermochemical processes that can be carried out in system 100a include Haber Bosch, Fischer-Tropsche, and thermochemical splitting of water.

Generally, system 100a includes process equipment 102 arranged to convert one or more feed streams 104 into one or more end product streams 106 by way of a thermochemical process that uses heat obtained directly from a subterranean heat source 108. An optional recycle stream 110 can be fed back into the one or more feed streams 104 to improve efficiency and reduce waste.

The exemplary process equipment 102 depicted in FIG. 1A includes at least a reaction chamber 112. The reaction chamber 112 can be the interior volume of a reactor vessel. The reaction chamber 112 can be operated at higher than ambient temperatures and pressures and for conducting a thermochemical process. The thermochemical process can be a batch process or a continuous process. The reaction chamber 112 is depicted as a single chamber, but in another embodiment, the reaction chamber 112 can include two or more reaction chambers to permit two or more discrete reactions to occur. The multiple reaction chambers can be housed in a single reactor vessel or separately in multiple reactor vessels.

The process equipment 102 can also include optional recovery equipment 114, which can be used to recover one or more end product streams 106. Recovery equipment 114 can be any one or more conventionally known pieces of equipment, such as a distillation column, condenser, stripping column, extraction tower, or other forms of separator vessel. For example, a reaction carried out in reaction chamber 112 can produce an intermediate product stream 116 that includes a gaseous end product as well as unreacted reactants in gaseous form. The intermediate product stream 116 can be conveyed to the optional recovery equipment 114 to be separated into one or more end product streams 106 formed entirely from the desired end product, and one or more recycle streams 110 formed from the unreacted reactants. In another example, a reaction carried out in reaction chamber 112 can produce an intermediate product stream 116 that can be separated out into an optional recycle stream 110 and a plurality of different end product streams 106 using conventional separations techniques.

The reaction chamber 112 is heated by heat obtained directly from a subterranean heat source accessible by a wellbore 118. Wellbore 118 is formed from a borehole and associated structures (not shown), such as casing strings, drill stem, fluid conduit(s), wellhead, and control equipment. The borehole of the wellbore 118 extends from a surface to an underground location selected to be able to provide the requisite amount of heat to provide the reaction chamber 112 with a necessary reaction temperature. The reaction temperature is the amount of heat necessary for a desired thermochemical reaction to occur according to desired parameters. For example, the reaction temperature can be the amount of heat necessary for the desired thermochemical reaction to occur within a predetermined time period, at a selected temperature, using a particular catalyst, etc.

In some embodiments, the requisite amount of heat can be obtained simply by drilling to an adequate depth without regard to the presence of subterranean geological formations. In these embodiments, the subterranean heat source is simply the ambient heat that increases as a function of borehole depth.

In other embodiments, the subterranean heat source is a magma body 108 and the requisite amount of heat can be obtained by drilling the borehole to a particular location based on the presence or proximity of the magma body 108. Magma body 108 is one or more subterranean geological formations that houses magma. Non-limiting examples of magma body 108 can include sills, laccoliths, lopoliths, diapirs, and plutons. In the example in FIG. 1, wellbore 118 is drilled so that the terminal end of its borehole is partially within a magma body 108a, e.g., a pluton, and so that the borehole passes past another magma body 108b, e.g., a lopolith.

A heat exchanger 120 disposed within the wellbore 118 can harness the heat directly from the subterranean heat source to provide the reaction chamber 112 with the reaction temperature for carrying out a thermochemical process. The heat exchanger 120 can be positioned at the terminal end of the borehole to harness heat from the magma body 108a or within the borehole at a predetermined depth proximate to magma body 108b to harness heat from the magma body 108b. The heat is transferred to a heating fluid 122a that is conveyed to the process equipment 102, e.g., reactor vessel housing the reaction chamber 112, to heat the reaction chamber 112. Spent heating fluid 122b is returned from the process equipment 102 to the heat exchanger 120 and recycled.

The subterranean heat source can also provide lower-than-ambient temperatures for the thermochemical process carried out in system 100a by implementation of an optional absorption chiller 124. The absorption chiller 124 can receive a heating fluid 122a from a heat exchanger 120 to form a cooling fluid 126a that can be conveyed to process equipment 102, e.g., to recovery equipment 114. The recovery equipment 114 can be a condenser that can condense a gaseous end product into a liquid phase for separation from unreacted reactants in the gaseous phase. Spent cooling fluid 126b can be returned to the absorption chiller 124 and reused. Spent heating fluid 122b can be returned from the absorption chiller 124 to the heat exchanger 120 and also reused.

Although not depicted in FIG. 1A, a catalyst can be provided to facilitate the thermochemical process. As discussed in more detail in the figures that follow, the catalyst can be located within the reaction chamber 112.

Figure 1B:
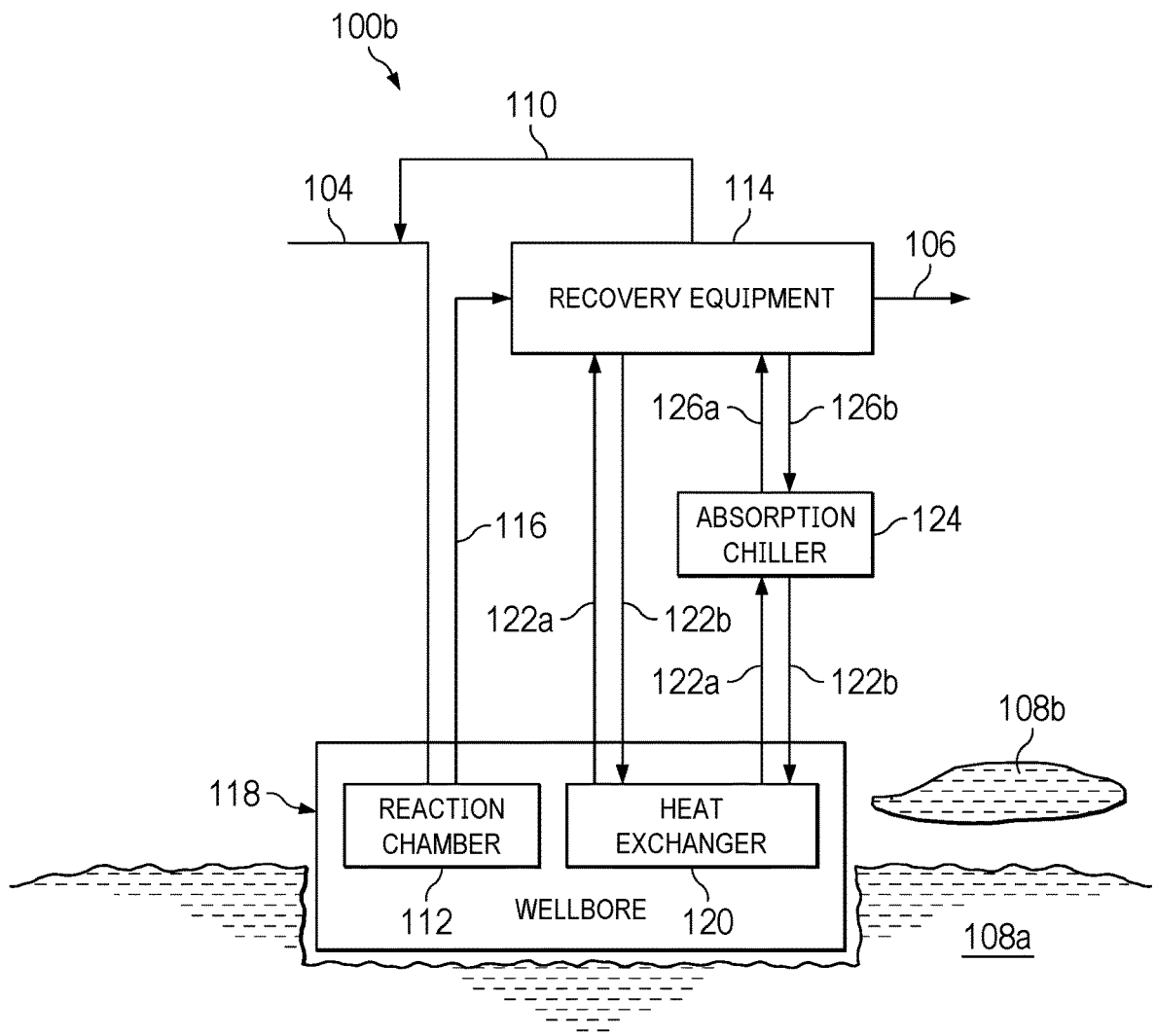
FIG. 1B is a simplified block diagram of another system for conducting thermochemical processes according to an illustrative embodiment.

FIG. 1B is a simplified block diagram of another system for conducting thermochemical processes according to an illustrative embodiment. Non-limiting examples of thermochemical processes that can be carried out in system 100b include Haber Bosch, Fischer-Tropsche, and thermochemical splitting of water.

Generally, system 100b includes process equipment arranged to convert one or more feed streams 104 into one or more end product streams 106 by way of a thermochemical process that uses heat obtained directly from a subterranean heat source 108. An optional recycle stream 110 can be fed back into the one or more feed streams 104 to improve efficiency and reduce waste.

System 100b differs from system 100a in that the reaction chamber 112 is located within the wellbore 118 to obtain heat directly from a subterranean heat source, e.g., magma body 108, rather than from a heat exchanger that harnesses the heat used by a reaction chamber located externally to the wellbore 118. In system 100b, the reaction chamber 112 can be the interior volume of a reactor vessel that is positioned within the wellbore 118.

In another embodiment, a volume within the wellbore 118 can serve as the reaction chamber 112. In this other embodiment, cased or uncased portions of the wellbore 118 can serve as the reaction chamber 112. Heat is provided to the reaction chamber 112 through the sidewalls of the wellbore 118 and through casing segments when present. The reaction chamber 112 can include additional equipment to increase the residence time of the reactants in the reaction chamber 112 or to promote exposure to a catalyst (not shown). For example, the reaction chamber can include a casing plate (not shown) that at least partially seals an upper end of the reaction chamber 112. The catalyst can be suspended from or otherwise coupled to the casing plate. In addition, or in the alternative, the reaction chamber 112 can house a baffle system (not shown) that promotes mixing and/or increases residence time of reactants in the reaction chamber 112.

Figure 2:
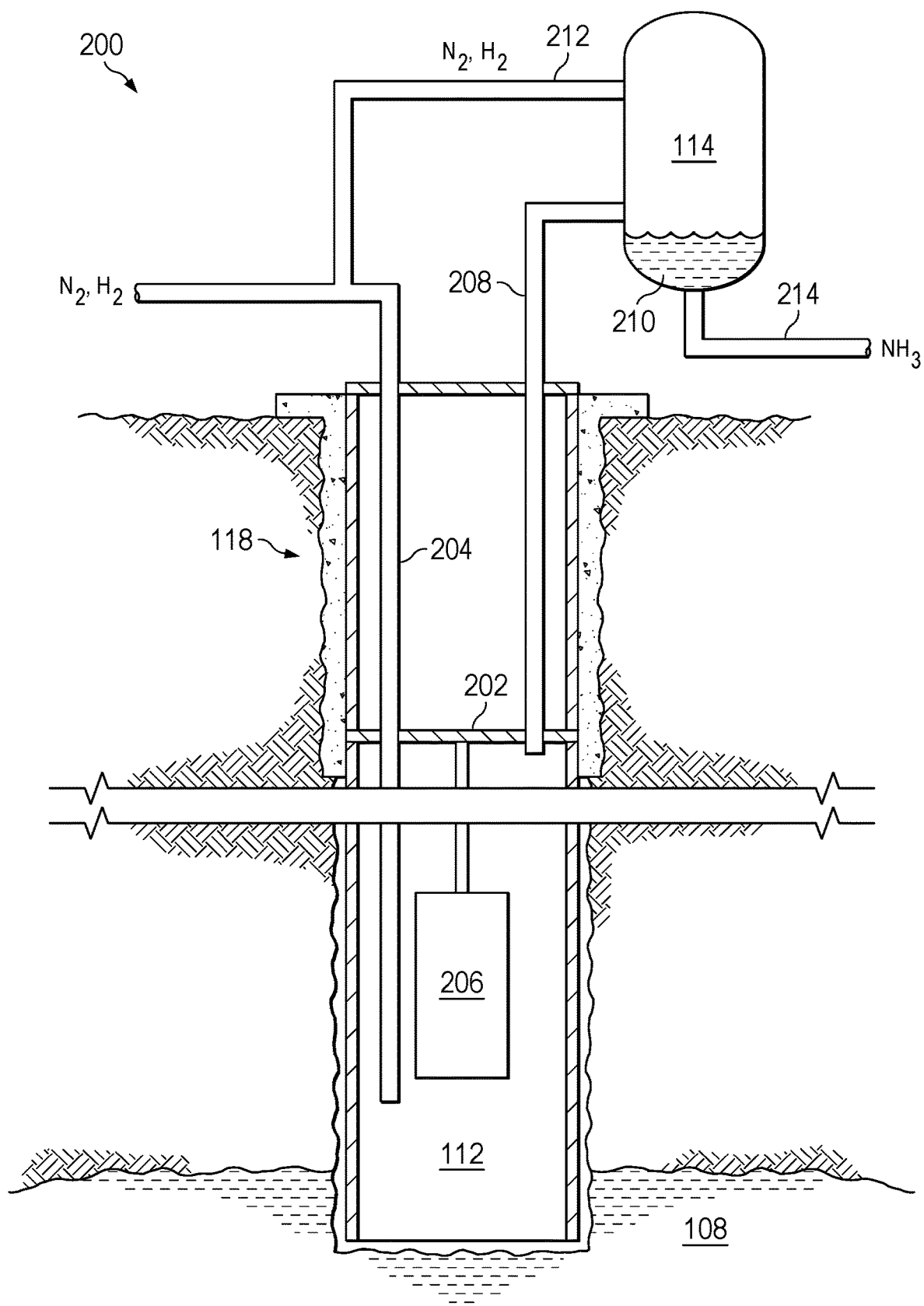
FIG. 2 is a schematic diagram of a first system for forming ammonia via a Haber Bosch process according to an illustrative embodiment.

FIG. 2 is a schematic diagram of a first system for forming a selected end product in a thermochemical process according to an illustrative embodiment. The system 200 can be configured to accommodate a Haber Bosch process to obtain ammonia from one or more feed streams comprised of $N_2$ and $H_2$. The ammonia can be formed in a reaction chamber 112 that is disposed within a wellbore 118 so that reaction chamber 112 can be heated directly by a subterranean heat source. In system 200, the reaction chamber 112 is an uncased portion of the wellbore 118 that obtains heat from magma body 108.

In this illustrative embodiment, the reaction chamber 112 is sealed at its upper end by a casing plate 202 that spans the diameter of the wellbore 118. One or more feed stream conduits 204 extends between one or more reactant sources (not shown) that form the feed stream and the reaction chamber 112. The one or more feed stream conduits 204 can pass through the casing plate 202 and extend into reaction chamber 112 to a predetermined depth. Exposure of the reactants to heat obtained directly from a subterranean heat source, e.g., magma body 108, and catalyst 206 causes at least some of the reactants to combine and form an intermediate product stream carried out of the reaction chamber 112 via one or more intermediate product stream conduits 208.

The intermediate product stream is conveyed into recovery equipment 114, which is a condenser in the system 200 depicted in FIG. 2. The condenser 114 separates the intermediate product stream into an unreacted reactant fraction that is fed back into the reaction chamber 112 via recycle stream conduit 212, and a liquid phase end product fraction 210 that is extracted from the condenser 114 by end product stream conduit 214. When system 200 is configured to produce ammonia by the Haber Bosch process, the feed stream includes $N_2$ and $H_2$ that is converted into an $NH_3$ end product according to the following equation: $N_2 + 3H_2 \rightarrow 2NH_3$.

In this illustrative embodiment, the catalyst 206 is depicted as generally suspended from the casing plate 202. In a particular example of this embodiment, the casing plate 202 can be configured with a series of baffles (not shown) coupled to the casing plate 202 and having external surfaces coated with a layer of catalyst 206. In another particular example of this embodiment, the casing plate can include a plurality of elongated members extending towards the terminal end of the borehole, each of which includes an external surface coated with a layer of catalyst 206.

Figure 3:
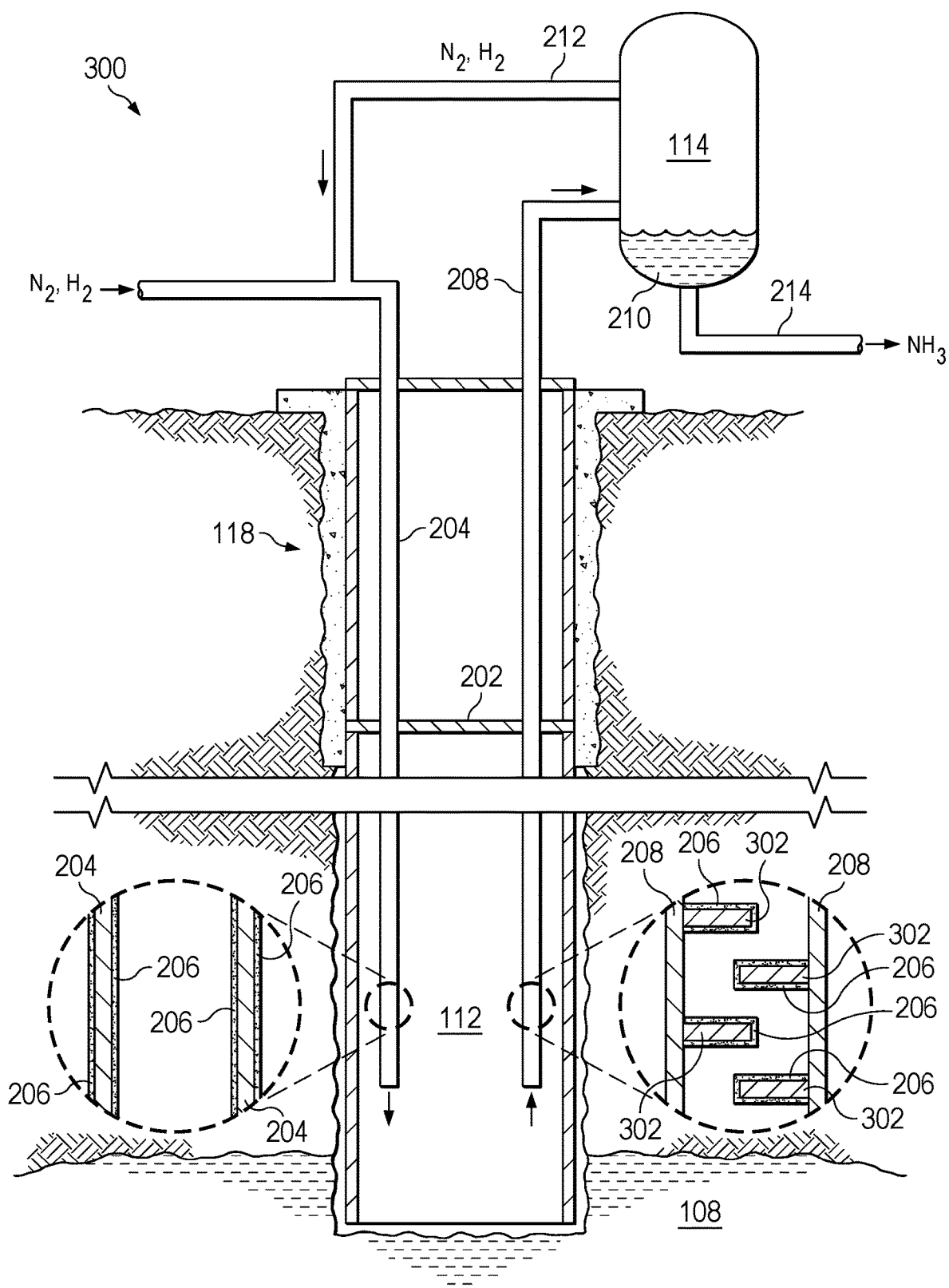
FIG. 3 is a schematic diagram of second system for forming ammonia via a Haber Bosch process according to an illustrative embodiment.

FIG. 3 is a schematic diagram of second system for forming a selected end product in a thermochemical process according to another illustrative embodiment. The system 300 is similar to the system 200 in FIG. 2 except that the catalyst 206 is applied to the surfaces of the one or more feed stream conduits 204 and/or the one or more intermediate product stream conduits 208. As an example, the catalyst 206 is shown applied to the inner and outer surfaces of the one or more feed stream conduits 204, and the catalyst 206 is shown applied to baffles 302 attached to the inner surfaces of the intermediate product stream conduits 208. These examples are illustrative and non-limiting.

Figure 4:
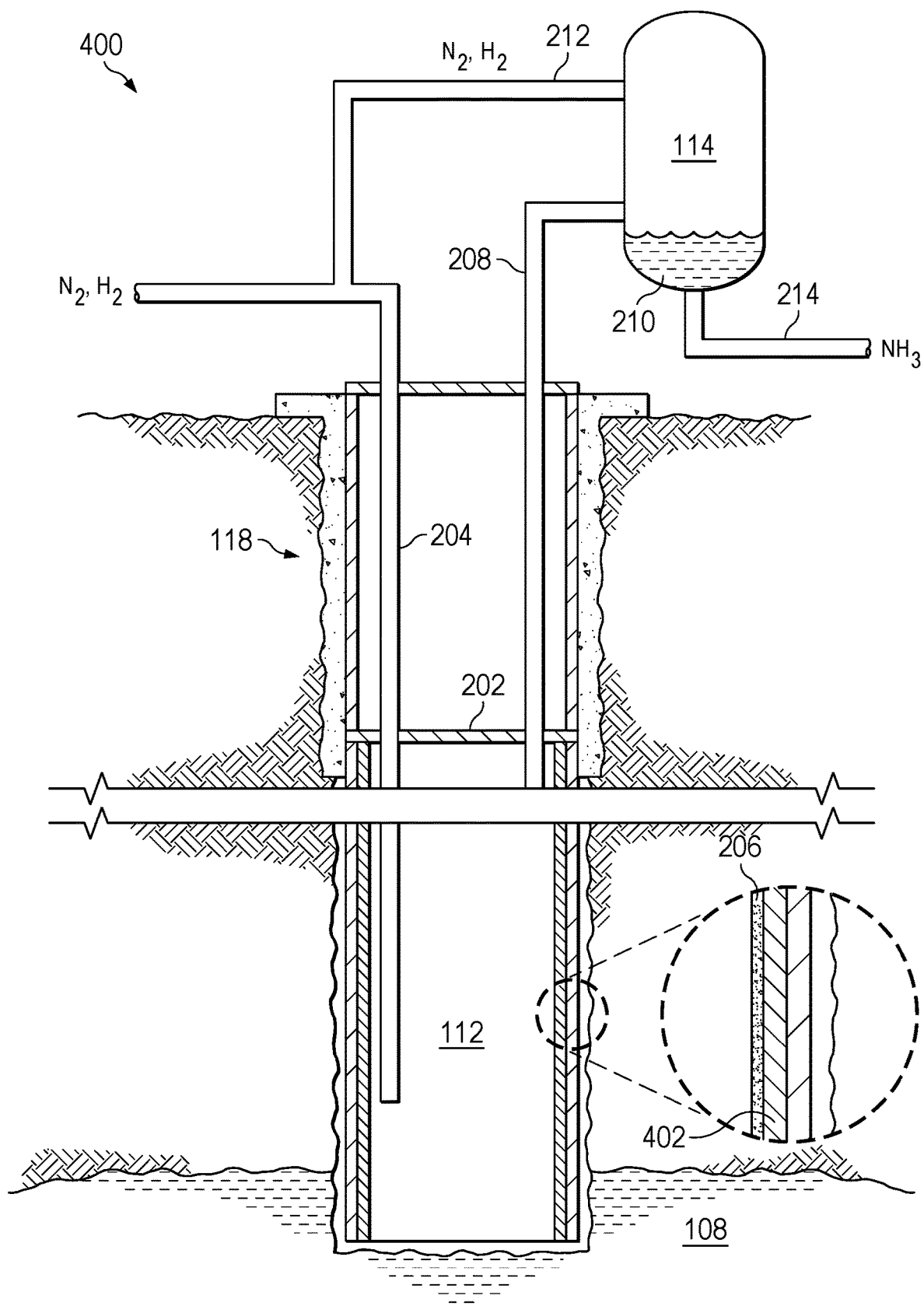
FIG. 4 is a schematic diagram of a third system for forming ammonia via a Haber Bosch process according to an illustrative embodiment.

FIG. 4 is a schematic diagram of third system for forming a selected end product in a thermochemical process according to another illustrative embodiment. The system 400 is similar to the system 200 in FIG. 2 except that the wellbore 118 includes a boiler casing 402 at least partially bounding the reaction chamber 112. The catalyst 206 is shown applied to the inner surfaces of the boiler casing 402. In an alternate embodiment, the catalyst 206 can be applied to features coupled to the inner surface of the boiler casing 402 which extend inwardly into the reaction chamber 112. For example, a honeycomb structure (not shown) spanning a diameter of the wellbore 118 can be attached to the inner surfaces of the boiler casing 402 and covered with catalyst 206. In another example, a baffle system (not shown) can be attached to the inner surfaces of the boiler casing 402 and covered with catalyst 206. These inwardly extending features increases the contact between the reactants in the feed stream and the catalyst 206 in the reaction chamber 112, which promotes conversion to intermediate product(s) and/or end product(s).

Figure 5:
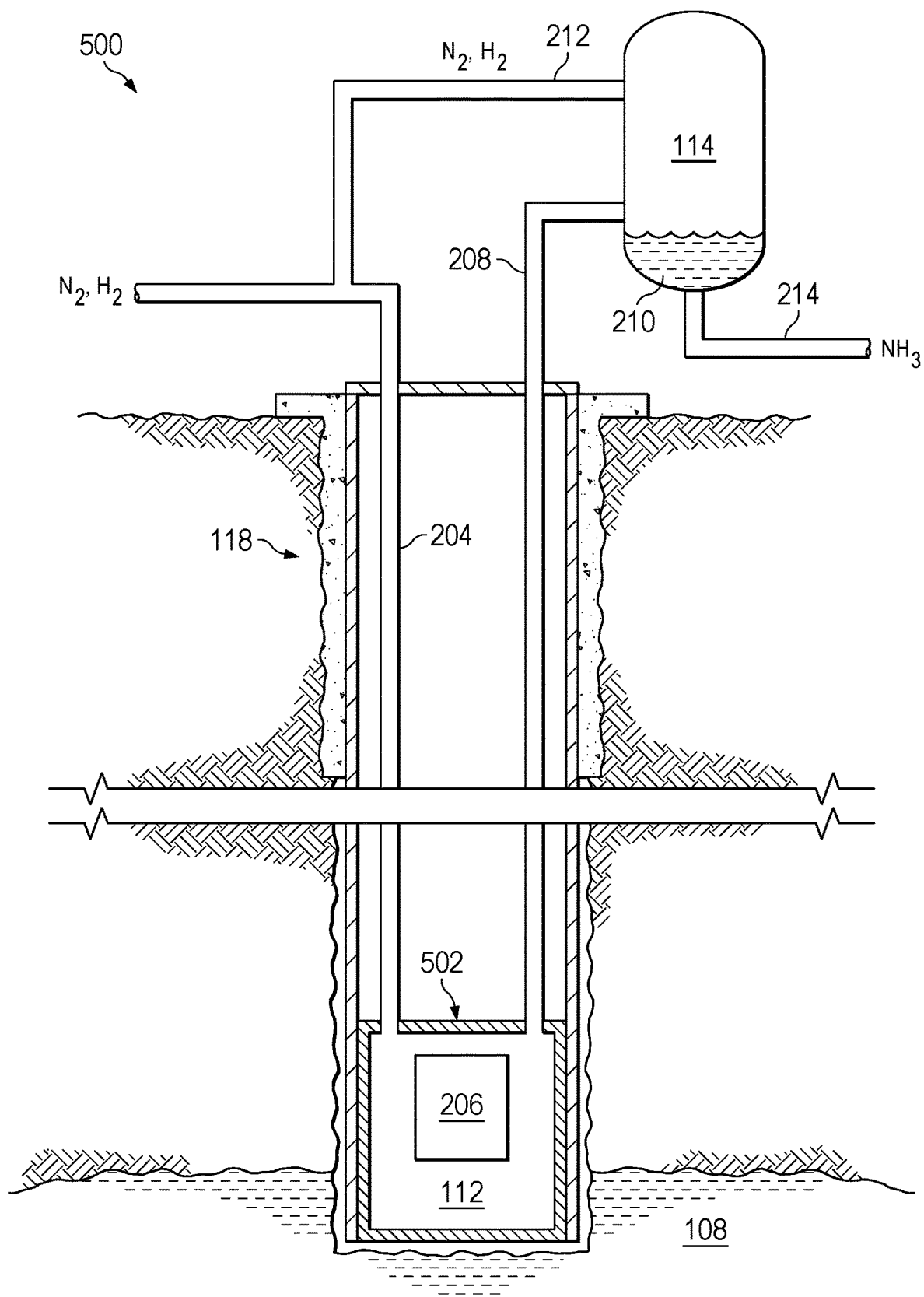
FIG. 5 is a schematic diagram of a fourth system for forming ammonia via a Haber Bosch process according to an illustrative embodiment.

FIG. 5 is a schematic diagram of fourth system for forming a selected end product in a thermochemical process according to another illustrative embodiment. The system 500 is similar to the system 200 in FIG. 2 except that the reaction chamber 112 is housed within a reactor vessel 502 positioned at the terminal end of the wellbore 118. Reactants are conveyed to the reaction chamber by the one or more feed stream conduits 204. The reactants are converted to intermediate product(s) and/or end products(s) in the presence of heat obtained directly from the magma body 108 and the catalyst 206.

Figure 6:
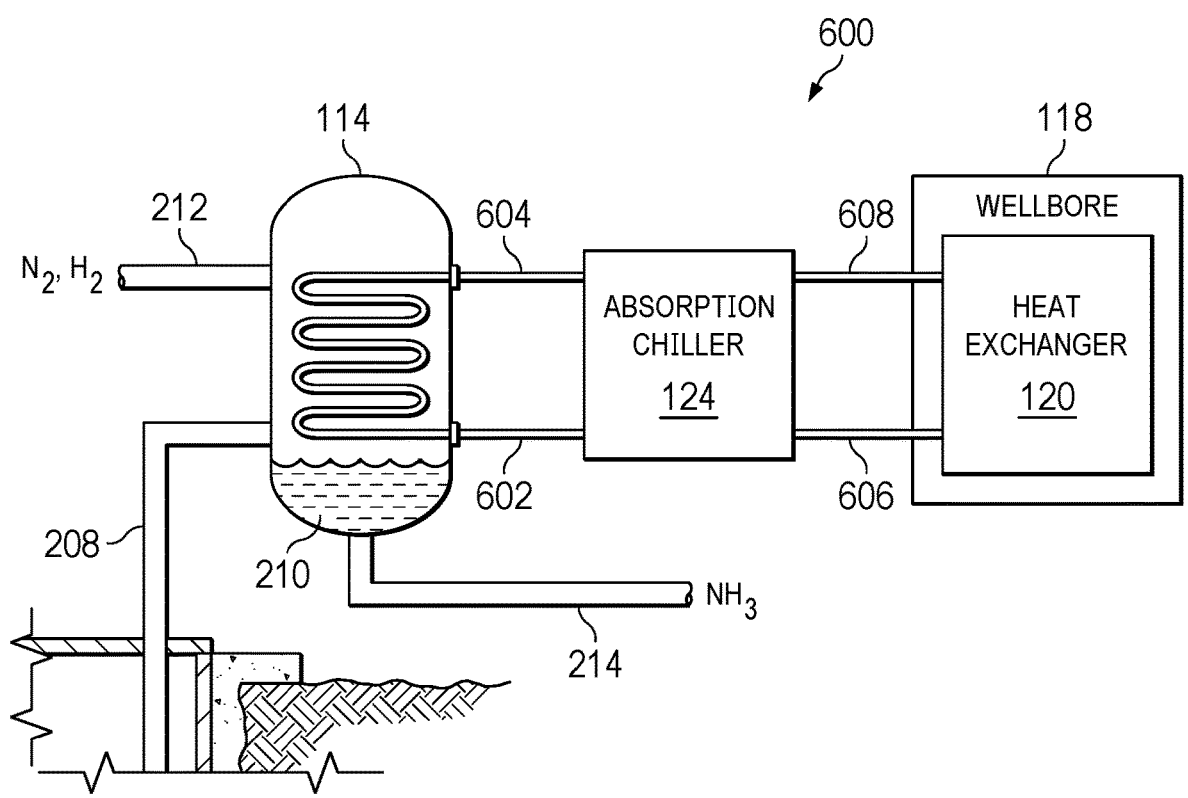
FIG. 6 is a more detailed view of product recovery equipment of a Haber Bosch process according to an illustrative embodiment.

FIG. 6 is a more detailed view of product recovery equipment in a system for forming a selected end product in a thermochemical process according to an illustrative embodiment. The recovery equipment 114 is a condenser that receives an intermediate product stream from one or more intermediate product stream conduits 208. The condenser receives cooling fluid from cooling fluid conduit 602 which can be used to separate a desired end product, such as ammonia, from unreacted reactants in processes that are known to those having ordinary skill in the art. The unreacted reactants are returned back to the reaction chamber via recycle stream conduit 212 and the end product 210 is collected in the condenser 114 in liquid form and removed from the condenser 114 in end product stream conduit 214.

The cooling fluid absorbs heat in the condenser 114 and is transformed into spent cooling fluid that is returned to the absorption chiller 124 in spent cooling fluid conduit 604 to be reused. As previously discussed, the absorption chiller 124 uses heat obtained directly from a subterranean heat source, e.g., magma bodies, to form cooling fluid delivered to the condenser 114. The absorption chiller 124 receives heating fluid from heat exchanger 120 via heating fluid conduit 606 and returns spent heating fluid to the heat exchanger 120 via spent heating fluid conduit 608 to form a continuous circuit, as described in more detail in FIGS. 1A and 1B, above.

Figure 7:
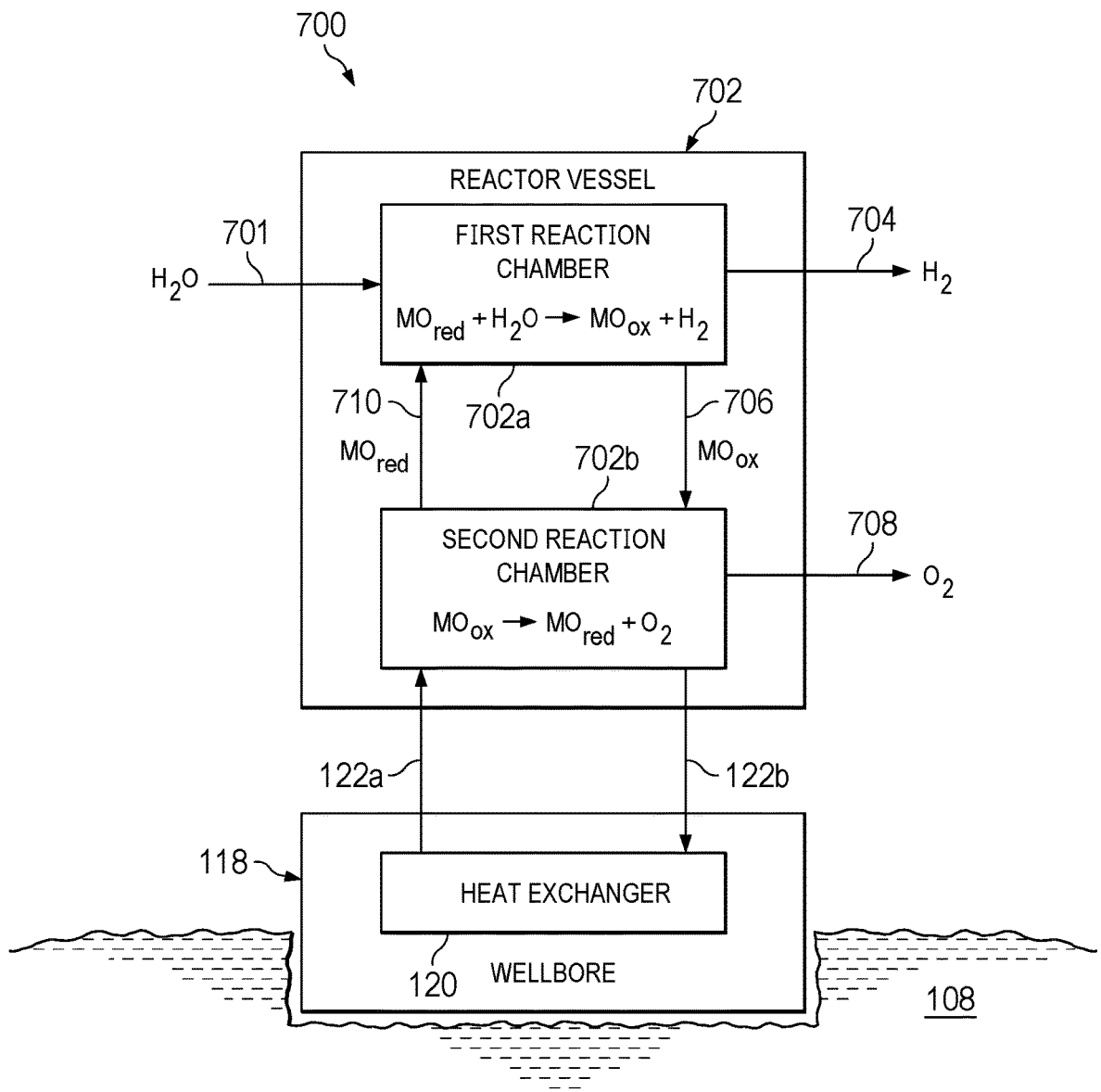
FIG. 7 is a simplified block diagram of a system for thermochemical splitting of water according to an illustrative embodiment.

FIG. 7 is a simplified block diagram of a system for thermochemical splitting of water according to an illustrative embodiment. The thermochemical splitting of water can occur according to any number of conventionally available processes, but the exemplary process described in FIG. 7 is described as a metal oxide redox reaction for the sake of simplicity and consistency. General equations for metal oxide redox reaction for the thermochemical splitting of water includes two steps:

$$MO_{ox} \rightarrow MO_{red} + \frac{1}{2}O_2 \quad \text{EQUATION 1}$$

$$MO_{red} + H_2O \rightarrow MO_{ox} + H_2 \quad \text{EQUATION 2}$$

The first equation represents an endothermic reaction, and the second equation represents an exothermic reaction.

The system 700 includes a reactor vessel 702 that includes a first reaction chamber 702a that accommodates an exothermic reaction of the thermochemical splitting process and a second reaction chamber 702b that accommodates an endothermic reaction of the thermochemical splitting process. While the reactor vessel 702 is depicted as a single vessel housing reaction chambers 702a and 702b, in another embodiment the reactor vessel 702 can be formed from two or more separate vessels, each housing one reaction chamber, and located in proximity to one another. Alternatively, the reactor vessel 702 can also be formed from two or more separate vessels located remote from one another, as in the embodiment in which the endothermic reaction of the thermochemical splitting process is carried out in a wellbore as described in more detail below.

Referring back to FIG. 7, heat for the endothermic step is provided by a heat exchanger 120 positioned within a wellbore 118, which can harness heat from a subterranean heat source 108 as previously described in FIG. 1A. In another embodiment, the second reaction chamber 702b can be located within the wellbore 118 to obviate the need for the underground heat exchanger 120. As previously described in FIG. 1B, the second reaction chamber can be housed within a reactor vessel positioned within the wellbore 118, or the second reaction chamber 702b can be formed from a cased or uncased volume within the wellbore 118.

Referring back to FIG. 7, a water feed stream 701 is provided to the first reaction chamber 702a to produce an $H_2$ product stream 704 and an $MO_{OX}$ intermediate product stream 706 that is fed into the second reaction chamber 702b. The second reaction chamber 702b is heated by heat obtained directly from a subterranean heat source to produce an $O_2$ product stream 708 and an $MO_{red}$ intermediate product stream 710 that is fed back into the first reaction chamber 702a. In some embodiments, the heat provided by the subterranean heat source provides the endothermic reaction occurring in the second reaction chamber 702b with a reaction temperature of 1,500° C. or higher, which can be easily achieved when the reaction chamber 702b is located within the wellbore 118.

Although not shown, the $H_2$ product stream 704 can be fluidically coupled to a system for generating ammonia from $H_2$ and $N_2$ feed streams, such the improved Haber Bosch systems 200, 300, and 400 in FIGS. 2, 3, and 4, respectively. Additionally, the $H_2$ product stream 704 can be fluidically coupled to a system for generating hydrocarbon fuels and other chemical products, such as the Fischer-Tropsche systems described in more detail in FIGS. 8 and 9 that follow.

Figure 8:
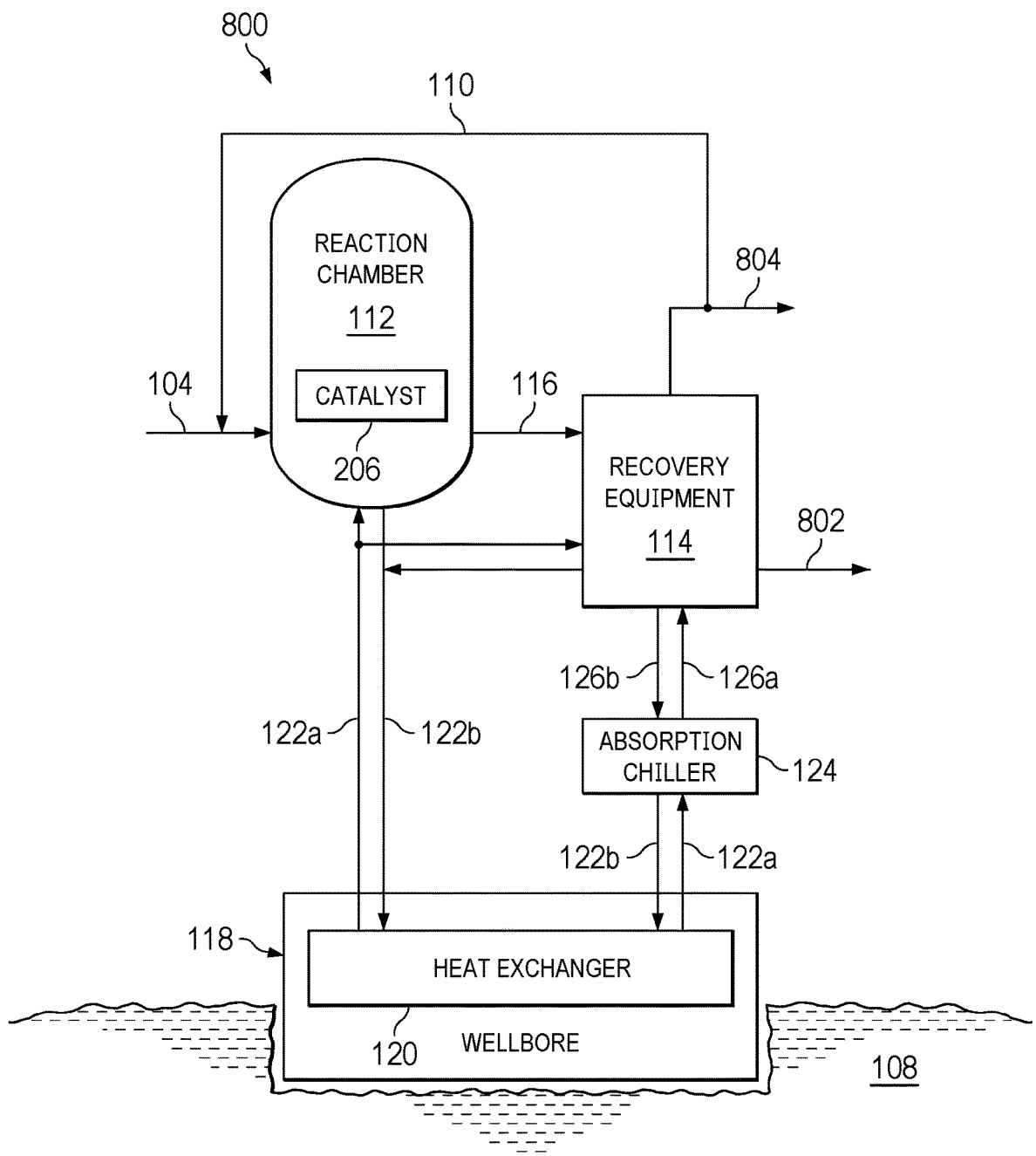
FIG. 8 is a simplified block diagram of a system for forming end products via a Fischer-Tropche process according to an illustrative embodiment.

FIG. 8 is a simplified block diagram of a system for forming end products via a Fischer-Tropche process according to an illustrative embodiment. The Fischer-Tropsche (FT) process is a catalytic chemical reaction that converts a synthesis gas, i.e., syngas, containing carbon monoxide (CO) and hydrogen (H2) into hydrocarbons of various molecular weights. Some of the principal FT synthesis reactions include the following:

Alkane synthesis: $nCO+(2n+1)H_2 \rightarrow C_nH_{2n+2}+nH_2O$;
Alkene synthesis: $nCO+(2n)H_2 \rightarrow C_nH_{2n}+nH_2O$;
Alcohol production: $nCO+(2n)H_2 \rightarrow C_nH_{2n+1}+(n-1)H_2O$; and
Water gas shift reaction: $CO+H_2O \rightarrow CO_2+H_2$.

System 800 produces one or more liquid-phase end products 802 and one or more gas-phase end products 804 from a syngas feed stream 104. The syngas feed stream 104 is supplied to a FT reactor housing a reaction chamber 112 heated to a reaction temperature by heat obtained directly from a subterranean heat source, such as magma body 108. The FT reactor can be any conventional FT reactor, such as a multi-tubular reactor, fixed-bed reactor, an entrained flow reactor, a slurry reactor, or a circulating fluidized bed reactor.

The intermediate product 116 extracted from the reaction chamber 112 can be processed by recovery equipment 114 to obtain the one or more liquid-phase end products 802 and the one or more gas-phase end products 804 using conventional processing techniques, but with heating provided by the subterranean heat source, and with cooling provided by an absorption chiller that is powered by the subterranean heat source.

In the exemplary system 800, heat is provided to the reaction chamber 112 from a heat exchanger 120 that obtains heat directly from a subterranean heat source, such as magma body 108. The heat is harnessed by heating fluid 122a that is conveyed to the reaction chamber 112 and then recycled back to the heat exchanger 120 for reuse. The heating fluid 122a can also be conveyed to an absorption chiller 124 that can use the heating fluid 122a to provide a cooling fluid 126a in ways that are known to those skilled in the art. The heating fluid 122a can also be conveyed directly to pieces of recovery equipment 114 to facilitate processing of the intermediate stream 116. The spent heating fluid 122b is returned to the heat exchanger 120 for reuse. The cooling fluid 126a can be used to reduce temperatures within various pieces of recovery equipment 114 for facilitating processing of the intermediate product 116 into the liquid-phase end products 802 and the gas-phase end products 804. Spent cooling fluid 126b is returned to the absorption chiller 124 for reuse.

Examples of recovery equipment 114 can include flash drums, hydrocrackers, and separators. Variation in the process conditions, i.e., catalyst type, temperature, unit operations, molecular sieves, etc., can produce higher molecular weight hydrocarbons recovered in the liquid-phase end products 802, such as hydrocarbon liquid fuels. The gas-phase end products 804 can be extracted from the system 800 or returned back to the Fischer Tropsche reactor in recycle stream 110.

Figure 9:
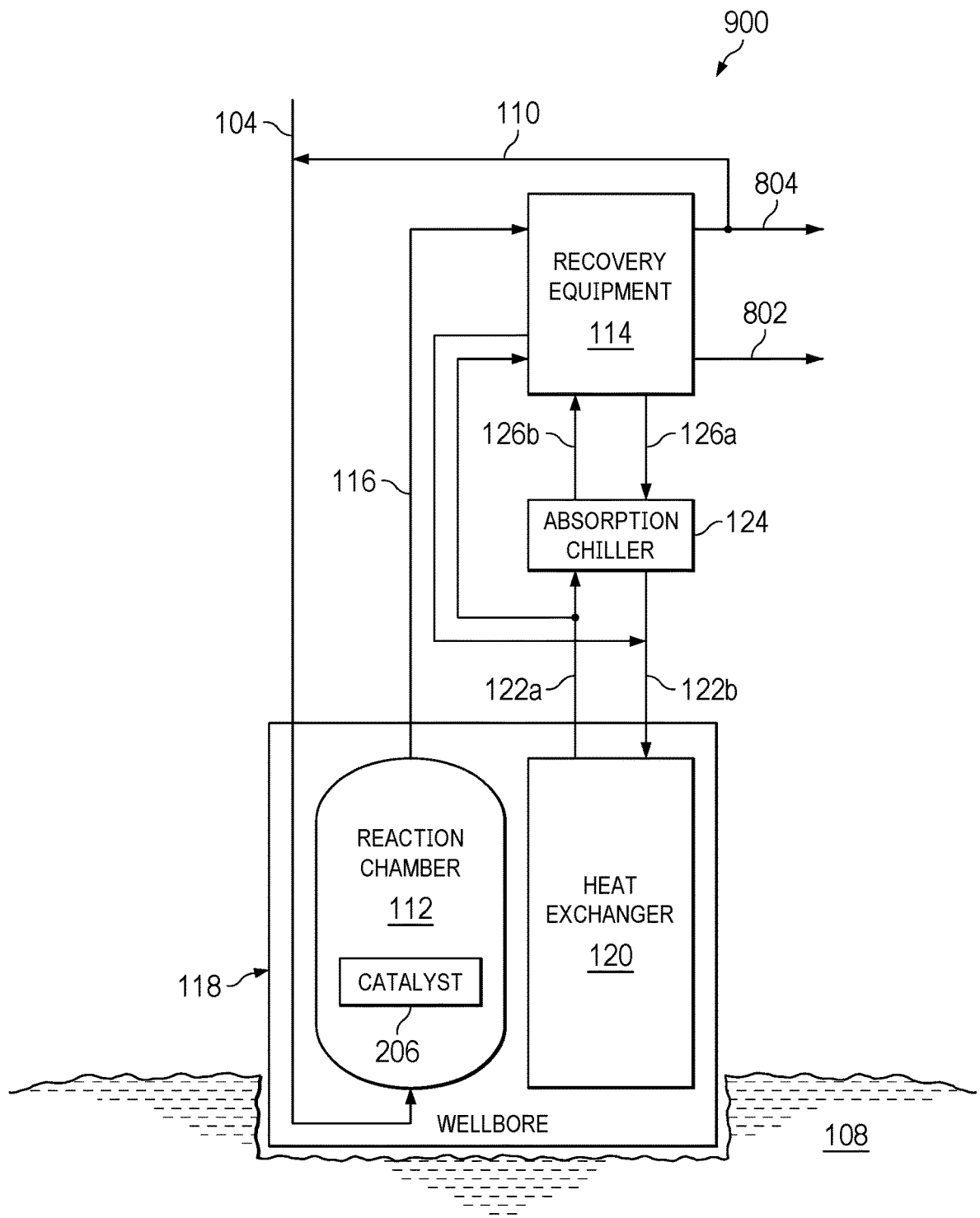
FIG. 9 is a simplified block diagram of a system for forming end products via a Fischer-Tropche process according to an illustrative embodiment.

FIG. 9 is a simplified block diagram of a system for forming end products via a Fischer-Tropche process according to an illustrative embodiment. The system 900 is like system 800 in FIG. 8 except that the FT reactor housing the reaction chamber 112 is disposed within the wellbore 118 to obtain heat directly from the subterranean heat source, such as magma body 108. System 900 can still include a heat exchanger 120 to provide heat to various pieces of recovery equipment 114 to facilitate processing of the intermediate stream 116, or to the absorption chiller 124 so that cooling fluid 126a can be provided to pieces of recovery equipment 114 as previously discussed.

Figure 10:
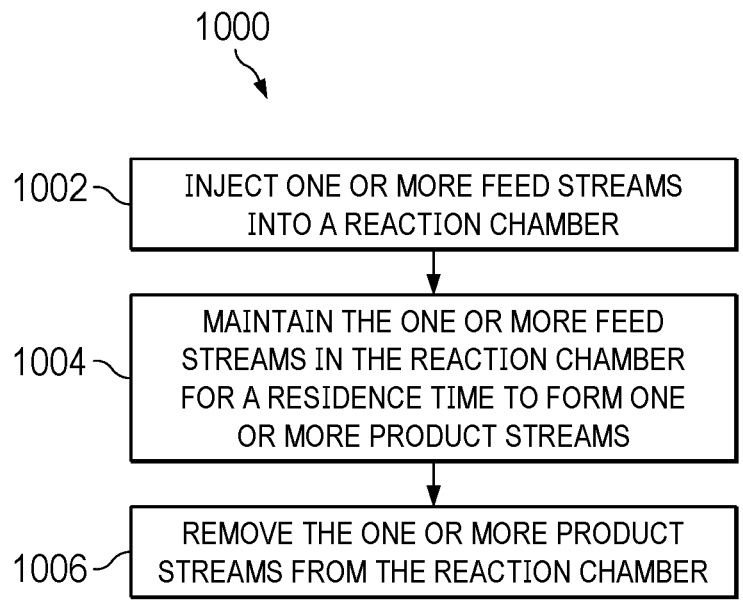
FIG. 10 is a flowchart of a process for carrying out a thermochemical process according to an illustrative embodiment.

FIG. 10 is a flowchart of a process for carrying out a thermochemical process according to an illustrative embodiment. The steps in flowchart 1000 can be carried out in a system, such as systems 100a and 100b in FIGS. 1A and 1B, or in the various systems described in FIGS. 2-9.

Flowchart 1000 begins at step 1002 by injecting one or more feed streams into a reaction chamber, such as reaction chamber 112. The reaction chamber is maintained at a reaction temperature using heat obtained directly from a subterranean heat source. An example of the subterranean heat source includes magma body 108.

In step 1004 the one or more feed streams is maintained in the reaction chamber for a residence time to form one product streams from the one or more feed streams that are removed from the reaction chamber in step 1006. The one or more product streams can be an intermediate product stream, such as intermediate product stream 116, which can be further processed to form one or more end product streams, such as end product stream 106, gas-phase end products 804, and/or liquid-phase end products 802. The one or more product streams can also be an end product stream that does not require further processing, such as product stream 704 and/or product stream 708.

Figure 11:
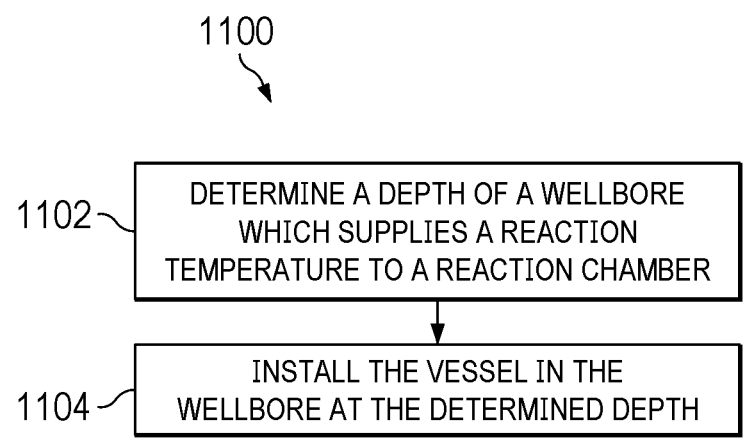
FIG. 11 is flowchart of a process for installing a vessel for use in a process for carrying out a thermochemical process according to an illustrative embodiment.

FIG. 11 is flowchart of a process for installing a vessel for use in a process for carrying out a thermochemical process according to an illustrative embodiment. Flowchart 1100 begins at step 1102 by determining a depth of the wellbore supplying a reaction temperature to the reaction chamber. In step 1104, the vessel is installed within the wellbore at the determined depth. Once the vessel has been installed within the wellbore, then the steps of flowchart 1100 can be carried out to form one or more product streams from one or more feed streams injected into the reaction chamber.

Figure 12:
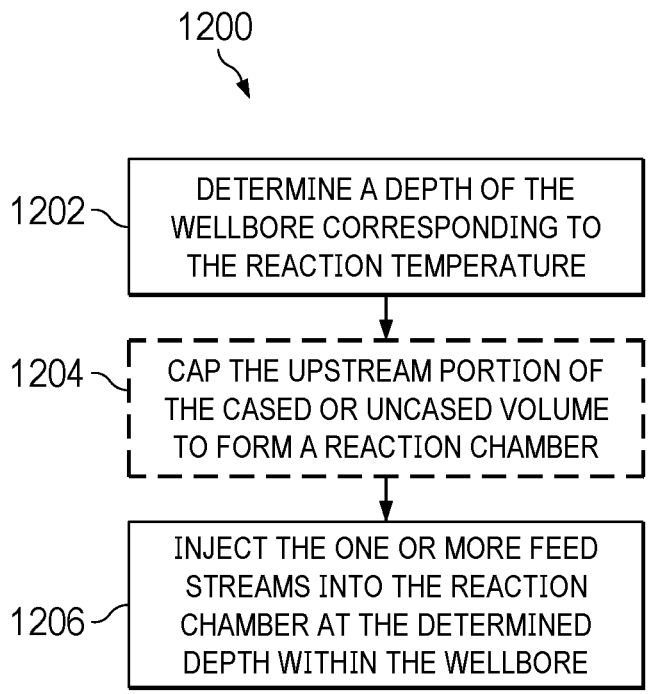
FIG. 12 is a flowchart of a more detailed process for injecting one or more feed streams into a reaction chamber according to an illustrative embodiment.

FIG. 12 is a flowchart of a more detailed process for injecting one or more feed streams into a reaction chamber according to an illustrative embodiment. The steps in flowchart 1200 can be carried out in step 1002 in FIG. 10 when the reaction chamber is a cased or uncased volume within the wellbore.

Flowchart 1200 begins at step 1202 by determining a depth of the wellbore corresponding to the reaction temperature. In an optional step 1204, the upstream portion of the cased or uncased volume is capped by a casing plate to form a reaction chamber. In step 1206, the one or more feed streams are injected into the reaction chamber at the determined depth within the wellbore.

Figure 13:
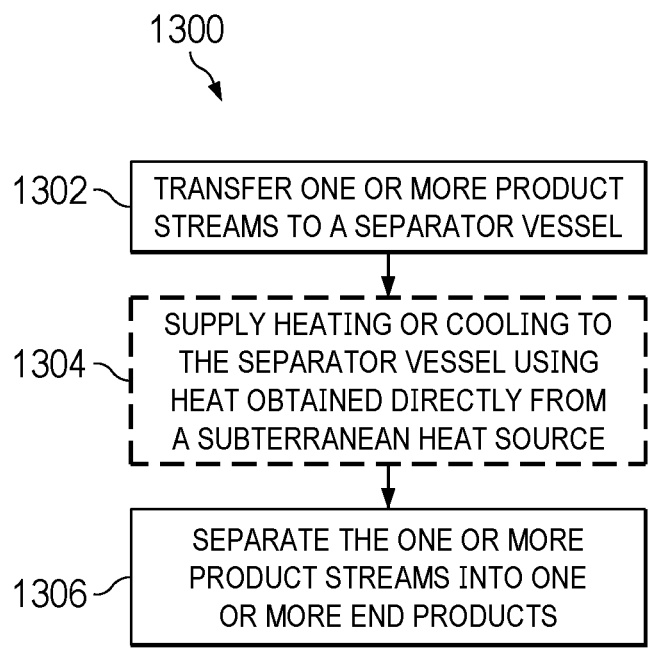
FIG. 13 is a flowchart of a process for processing a product stream formed by a thermochemical process according to an illustrative embodiment.

FIG. 13 is a flowchart of a process for processing a product stream formed by a thermochemical process according to an illustrative embodiment. Steps of flowchart 1300 can be implemented following the removing step 1006 in FIG. 10.

Flowchart 1300 begins at step 1302 by transferring the one or more product streams to a separator vessel. Depending upon the type of the separator vessel and the type of separations process implemented, the separator vessel can be heated by heating fluid that obtained its heat directly from a subterranean heat source or cooled by cooling fluid formed by heating fluid that obtained its heat directly from the subterranean heat source. Thus, flowchart 1300 includes the optional step 1304 of supplying heating or cooling to the separator vessel using heat obtained directly from a subterranean heat source. In step 1306, the one or more product streams are separated into one or more end products.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Further, various systems are described herein specific to the Haber Bosch process, the Fischer Tropsche process, and the thermochemical splitting of water, but the novel aspects of this disclosure can be applied to other processes in which heat obtained directly from a subterranean heat source can be used to drive thermochemical reactions.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosed systems and methods to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Additional Embodiments

The following descriptive embodiments are offered in further support of the novel aspects of this disclosure.

In a first embodiment, novel aspects of the present disclosure are directed to a method for carrying out a thermochemical process. The method includes the step of injecting one or more feed streams into a reaction chamber. The reaction chamber can be maintained at a reaction temperature using heat obtained directly from a subterranean heat source. The method also includes the steps of maintaining the one or more feed streams in the reaction chamber for a residence time to form one or more product streams from the one or more feed streams and removing the one or more product streams from the reaction chamber.

In another aspect of the first embodiment, the method includes the step of injecting one or more feed streams into a reaction chamber. The reaction chamber can be maintained at a reaction temperature using heat obtained directly from a subterranean heat source. The method also includes the steps of maintaining the one or more feed streams in the reaction chamber for a residence time to form one or more product streams from the one or more feed streams and removing the one or more product streams from the reaction chamber. The method also includes one or more limitations selected from the following list:

wherein the reaction chamber is housed within a vessel disposed within a wellbore;

determining a depth of the wellbore supplying the reaction temperature to the reaction chamber, and installing the vessel within the wellbore at the determined depth;

wherein the vessel is located at least partially within a magma reservoir;

wherein the reaction chamber is a cased or uncased volume within the wellbore;

determining a depth of the wellbore corresponding to the reaction temperature, and injecting the one or more feed streams into the reaction chamber at the determined depth within the wellbore;

capping an upstream portion of the uncased volume with a plate to form the reaction chamber, wherein the one or more feed streams is injected through an inlet of the plate, and wherein the one or more product streams is removed from an outlet of the plate;

wherein the reaction chamber is located externally to a wellbore, and wherein the heat is supplied to the reaction chamber from a heat exchanger disposed at a depth within the wellbore to supply heating fluid to heat the reaction chamber to the reaction temperature;

transferring the one or more product streams to a separator vessel, and separating the one or more product streams into one or more end products;

supplying at least some of the heat to an absorption chiller to form a cooling fluid, and cooling the separator vessel with the cooling fluid form the one or more end products; and wherein maintaining the one or more feed streams in the reaction chamber for a residence time to form one or more product streams from the one or more feed streams further comprises exposing the one or more feed streams to a catalyst in the reaction chamber.

In a second embodiment, novel aspects of the present disclosure are directed to a system for carrying out thermochemical processes. The system includes a wellbore extending from a surface towards a subterranean heat source and a reaction chamber configured to be maintained at a reaction temperature using heat obtained directly from the subterranean heat source. In some embodiments, the reaction chamber includes one or more inlets configured to receive one or more feed streams and one or more outlets configured to expel one or more product streams from the reaction chamber. The one or more product streams are formed from the one or more feed streams in response to maintaining the one or more feed streams within the reaction chamber for a residence time.

In another aspect of the second embodiment, the system includes a wellbore extending from a surface towards a subterranean heat source and a reaction chamber configured to be maintained at a reaction temperature using heat obtained directly from the subterranean heat source. In some embodiments, the reaction chamber includes one or more inlets configured to receive one or more feed streams and one or more outlets configured to expel one or more product streams from the reaction chamber. The one or more product streams are formed from the one or more feed streams in response to maintaining the one or more feed streams within the reaction chamber for a residence time. The system also includes one or more limitations selected from the following list:

a vessel disposed within the wellbore, wherein the reaction chamber is housed within the vessel;

wherein the vessel is installed at a depth within the wellbore which provides the reaction chamber with the reaction temperature;

wherein the vessel is located at least partially within a magma reservoir;

wherein the reaction chamber is a cased or uncased volume of space within the wellbore;

wherein the reaction chamber includes a cap spanning an upstream portion of the cased or uncased volume of space;

a first set of fluid conduits extending through the wellbore which brings the one or more feed streams to the reaction chamber, and a second set of fluid conduits extending through the wellbore which removes the one or more product streams from the reaction chamber;

wherein the reaction chamber is a vessel located externally to a wellbore, and wherein system further comprises a heat exchanger disposed at a depth within the wellbore to supply a heating fluid to the vessel to heat the reaction chamber to the reaction temperature;

a separator vessel coupled to the reaction chamber, wherein the separator vessel separates the one or more product streams into one or more end products;

a heat exchanger disposed at a depth within a wellbore to supply a heating fluid, and an absorption chiller connected to the heat exchanger, wherein the absorption chiller forms a cooling fluid from the heating fluid, and wherein the separator vessel is cooled with the cooling fluid; and wherein the reaction chamber further comprises a catalyst disposed within the reaction chamber.

We claim:

1. A method for carrying out a thermochemical process, the method comprising:

injecting one or more feed streams into a reaction chamber, wherein the reaction chamber is maintained at a reaction temperature using heat obtained directly from a subterranean heat source;

maintaining the one or more feed streams in the reaction chamber for a residence time to form one or more product streams from the one or more feed streams;

removing the one or more product streams from the reaction chamber;

transferring the one or more product streams to a separator vessel;
separating the one or more product streams into two or more end products;
supplying at least some of the heat to an absorption chiller to form a cooling fluid; and
cooling the separator vessel with the cooling fluid form the two or more end products.

2. The method of claim 1, wherein the reaction chamber is housed within a vessel disposed within a wellbore.

3. The method of claim 2, further comprising:
determining a depth of the wellbore supplying the reaction temperature to the reaction chamber; and
installing the vessel within the wellbore at the determined depth.

4. The method of claim 3, wherein the vessel is located at least partially within a magma reservoir.

5. The method of claim 2, wherein the reaction chamber is a cased or uncased volume within the wellbore.

6. The method of claim 5, further comprising:
determining a depth of the wellbore corresponding to the reaction temperature; and
injecting the one or more feed streams into the reaction chamber at the determined depth within the wellbore.

7. The method of claim 6, further comprising:
capping an upstream portion of the uncased volume with a plate to form the reaction chamber, wherein the one or more feed streams is injected through an inlet of the plate, and wherein the one or more product streams is removed from an outlet of the plate.

8. The method of claim 1, wherein the reaction chamber is located externally to a wellbore, and wherein the heat is supplied to the reaction chamber from a heat exchanger disposed at a depth within the wellbore to supply heating fluid to heat the reaction chamber to the reaction temperature.

9. The method of claim 1, wherein maintaining the one or more feed streams in the reaction chamber for a residence time to form one or more product streams from the one or more feed streams further comprises:
exposing the one or more feed streams to a catalyst in the reaction chamber.

10. A system comprising:
a wellbore extending from a surface towards a subterranean heat source;
a reaction chamber configured to be maintained at a reaction temperature using heat obtained directly from the subterranean heat source, wherein one or more feed streams provided to the reaction chamber are formed into one or more product streams in response to maintaining the one or more feed streams within the reaction chamber for a residence time;
a separator vessel coupled to the reaction chamber, wherein the separator vessel separates the one or more product streams into one or more end products;
a heat exchanger disposed at a depth within the wellbore to supply a heating fluid; and an absorption chiller connected to the heat exchanger, wherein the absorption chiller forms a cooling fluid from the heating fluid, and wherein the separator vessel is cooled with the cooling fluid.

11. The system of claim 10, further comprising a vessel disposed within the wellbore, wherein the reaction chamber is housed within the vessel.

12. The system of claim 11, wherein the vessel is installed at a depth within the wellbore which provides the reaction chamber with the reaction temperature.

13. The system of claim 12, wherein the vessel is located at least partially within a magma reservoir.

14. The system of claim 10, wherein the reaction chamber is a cased or uncased volume of space within the wellbore.

15. The system of claim 14, wherein the reaction chamber includes a cap spanning an upstream portion of the cased or uncased volume of space.

16. The system of claim 10, further comprising:
a first set of fluid conduits extending through the wellbore which brings the one or more feed streams to the reaction chamber; and
a second set of fluid conduits extending through the wellbore which removes the one or more product streams from the reaction chamber.

17. The system of claim 10, wherein the reaction chamber is a vessel located externally to the wellbore, and wherein the system further comprises:
a heat exchanger disposed at a depth within the wellbore to supply a heating fluid to the vessel to heat the reaction chamber to the reaction temperature.

18. The system of claim 10, wherein the reaction chamber further comprises a catalyst disposed within the reaction chamber.

19. A method for carrying out a thermochemical process, the method comprising:
determining a depth of a wellbore corresponding to a reaction temperature;
injecting one or more feed streams into a reaction chamber at the determined depth within the wellbore, wherein the reaction chamber is maintained at the reaction temperature using heat obtained directly from a subterranean heat source, wherein the reaction chamber is housed within a vessel disposed within a wellbore, wherein the reaction chamber comprises an uncased volume within the wellbore;
maintaining the one or more feed streams in the reaction chamber for a residence time to form one or more product streams from the one or more feed streams; and
removing the one or more product streams from the reaction chamber;
wherein the method further comprises capping an upstream portion of the uncased volume with a plate to form the reaction chamber, wherein the one or more feed streams is injected through an inlet of the plate, and wherein the one or more product streams is removed from an outlet of the plate.

20. The method of claim 19, further comprising:
determining a depth of the wellbore supplying the reaction temperature to the reaction chamber; and
installing the vessel within the wellbore at the determined depth.

21. The method of claim 20, wherein the vessel is located at least partially within a magma reservoir.

22. The method of claim 19, wherein maintaining the one or more feed streams in the reaction chamber for a residence time to form one or more product streams from the one or more feed streams further comprises:
exposing the one or more feed streams to a catalyst in the reaction chamber.

23. A system comprising:
a wellbore extending from a surface towards a subterranean heat source;
a reaction chamber configured to be maintained at a reaction temperature using heat obtained directly from the subterranean heat source, wherein one or more feed streams provided to the reaction chamber are formed into one or more product streams in response to maintaining the one or more feed streams within the reaction chamber for a residence time, wherein the reaction chamber is a cased or uncased volume of space within the wellbore, wherein the reaction chamber includes a cap spanning an upstream portion of the cased or uncased volume of space; and a vessel disposed within the wellbore, wherein the reaction chamber is housed within the vessel, wherein the vessel is installed at a depth within the wellbore which provides the reaction chamber with the reaction temperature, and wherein the vessel is located at least partially within a magma reservoir.

24. The system of claim 23, further comprising:

a first set of fluid conduits extending through the wellbore which brings the one or more feed streams to the reaction chamber; and a second set of fluid conduits extending through the wellbore which removes the one or more product streams from the reaction chamber.

* * * * *